US006503393B2

(12) United States Patent
Caiozza

(10) Patent No.: US 6,503,393 B2
(45) Date of Patent: Jan. 7, 2003

(54) OIL PAN CONTAINING A MAGNETIC FILTER APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 82 days.

(21) Appl. No.: 09/823,397

(22) Filed: Mar. 31, 2001

(65) Prior Publication Data

US 2002/0139737 A1 Oct. 3, 2002

(51) Int. Cl.[7] .................................................. B01D 35/06

(52) U.S. Cl. ...................... 210/222; 210/172; 184/6.25; 184/106; 335/305; 335/306

(58) Field of Search ................................ 210/222, 223, 210/172; 184/6.25, 106; 335/305, 306

(56) References Cited

U.S. PATENT DOCUMENTS 2,678,728 A * 5/1954 Spodig .................... 209/223.1
3,211,291 A * 10/1965 Teutsch ...................... 210/172
5,510,024 A * 4/1996 Caiozza ...................... 210/186
5,879,549 A * 3/1999 Caiozza ...................... 210/186

* cited by examiner

*Primary Examiner*—Matthew O. Savage

(57) ABSTRACT

An oil pan containing a magnetic filter apparatus includes an oil pan member having a magnet assembly reception channel. A magnetic filter assembly is received in the magnet assembly reception channel, and attachment means are provided for attaching the magnetic filter assembly to the oil pan member. The magnetic filter assembly separates ferromagnetic particles from oil in the oil pan member and traps the separated particles on the magnetic filter assembly. The magnetic filter assembly includes a magnet support unit which is attachable to the attachment means. A magnet unit is supported by the magnet support unit. The magnet unit provides a high magnetic flux region to circulating oil in the vicinity of an oil pump intake tube for trapping metal particles on the magnetic filter assembly. The magnet unit includes a plurality of individual magnets arrayed in highly cohesive relationship.

18 Claims, 12 Drawing Sheets

FIG 1
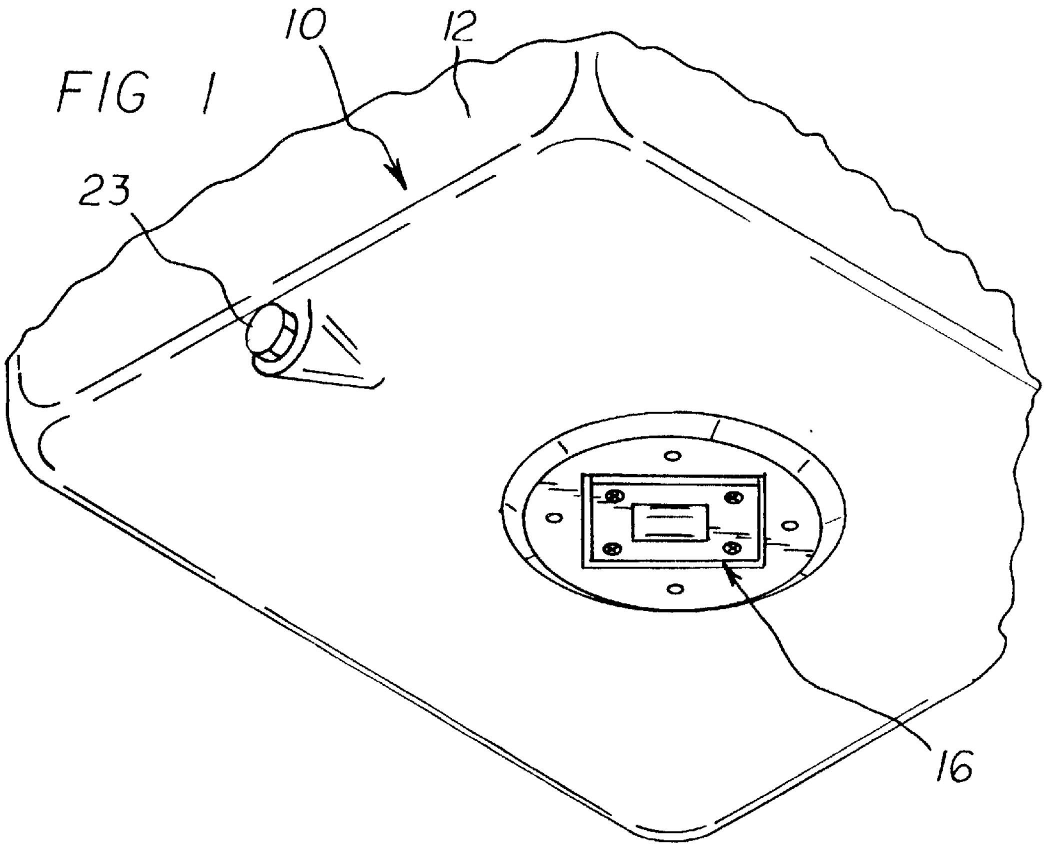
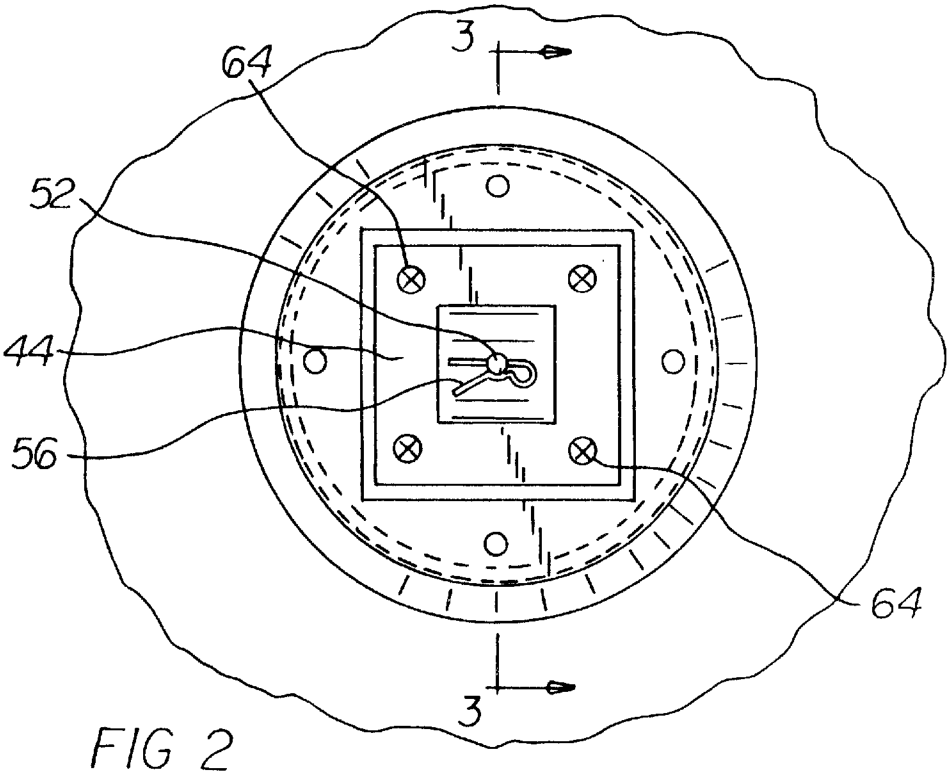
FIG 2

FIG 3
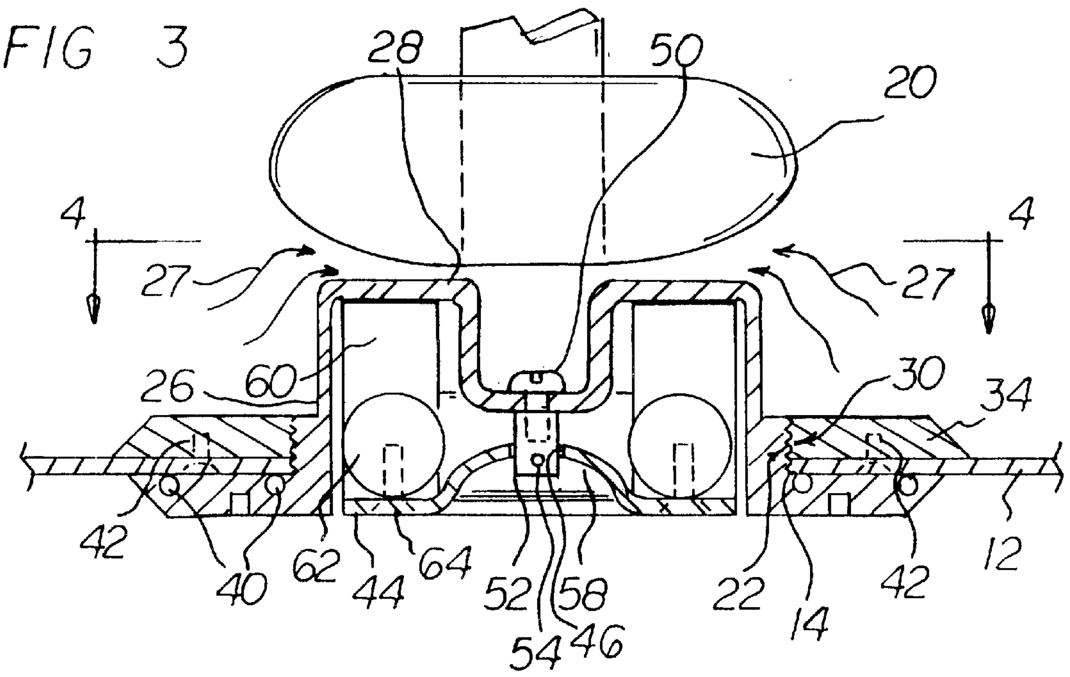
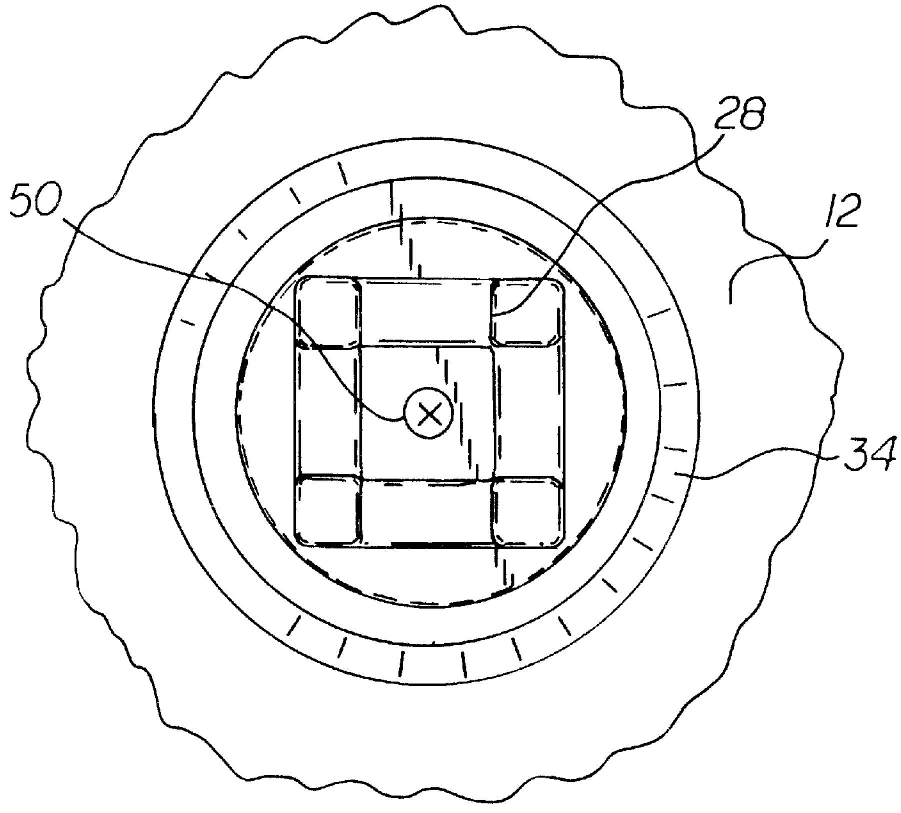
FIG 4

FIG 5
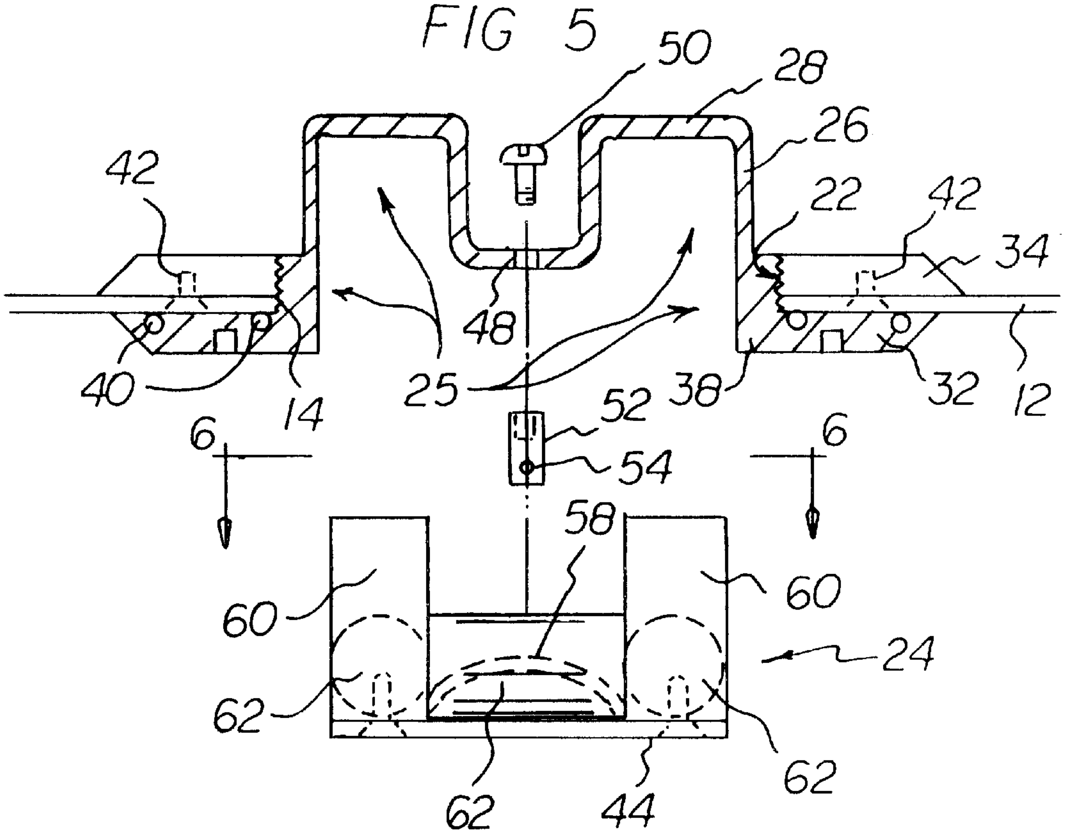
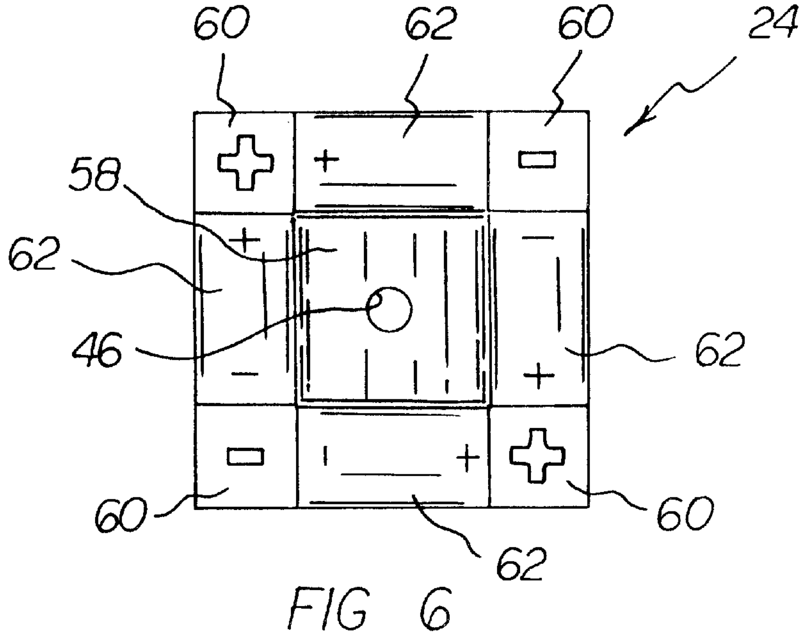
FIG 6

FIG 8
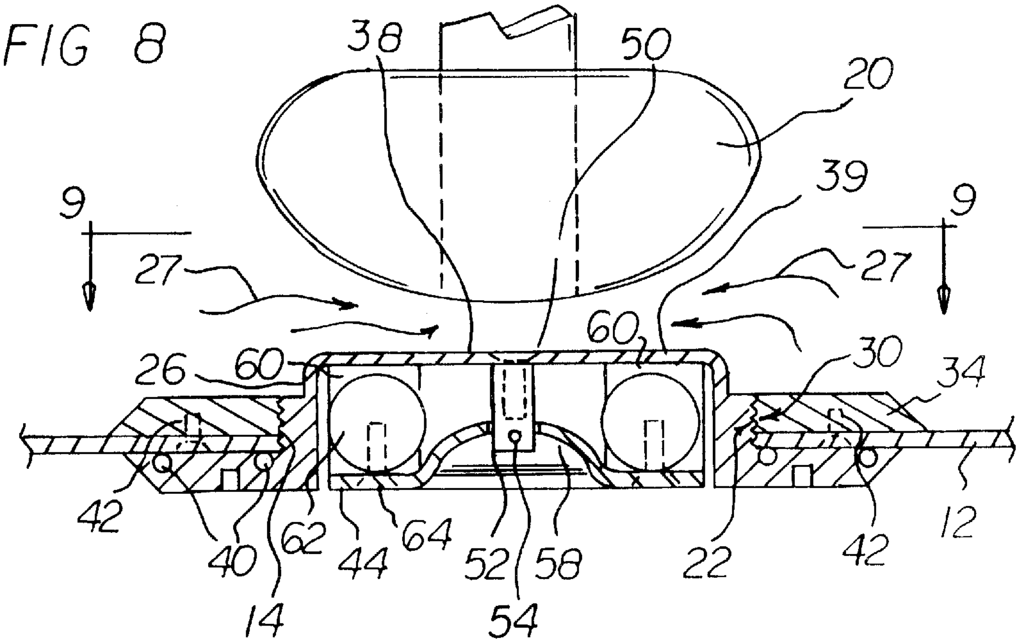
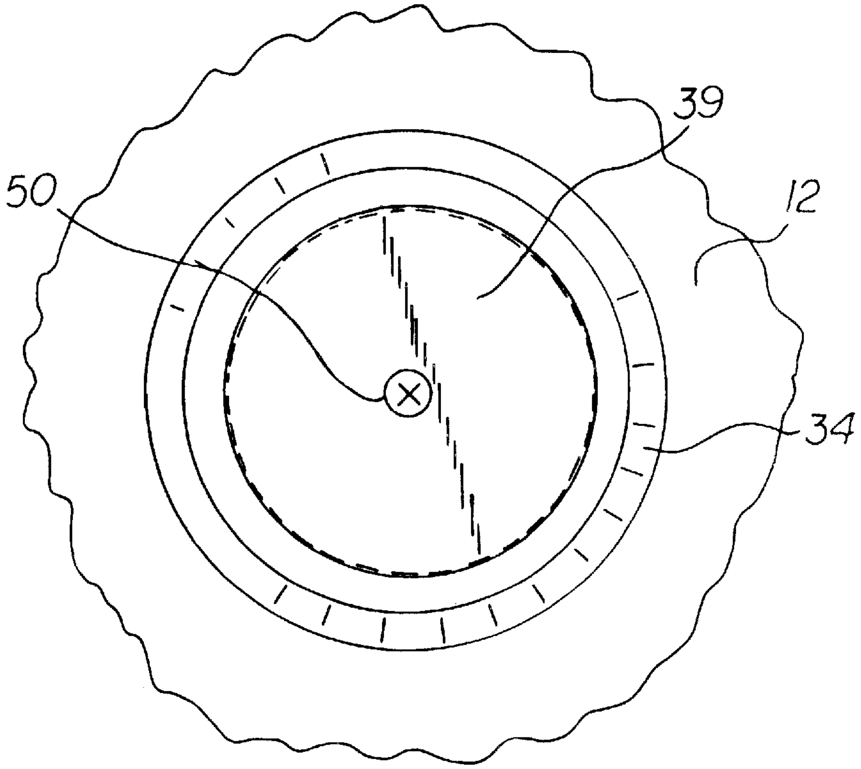
FIG 9

FIG 10
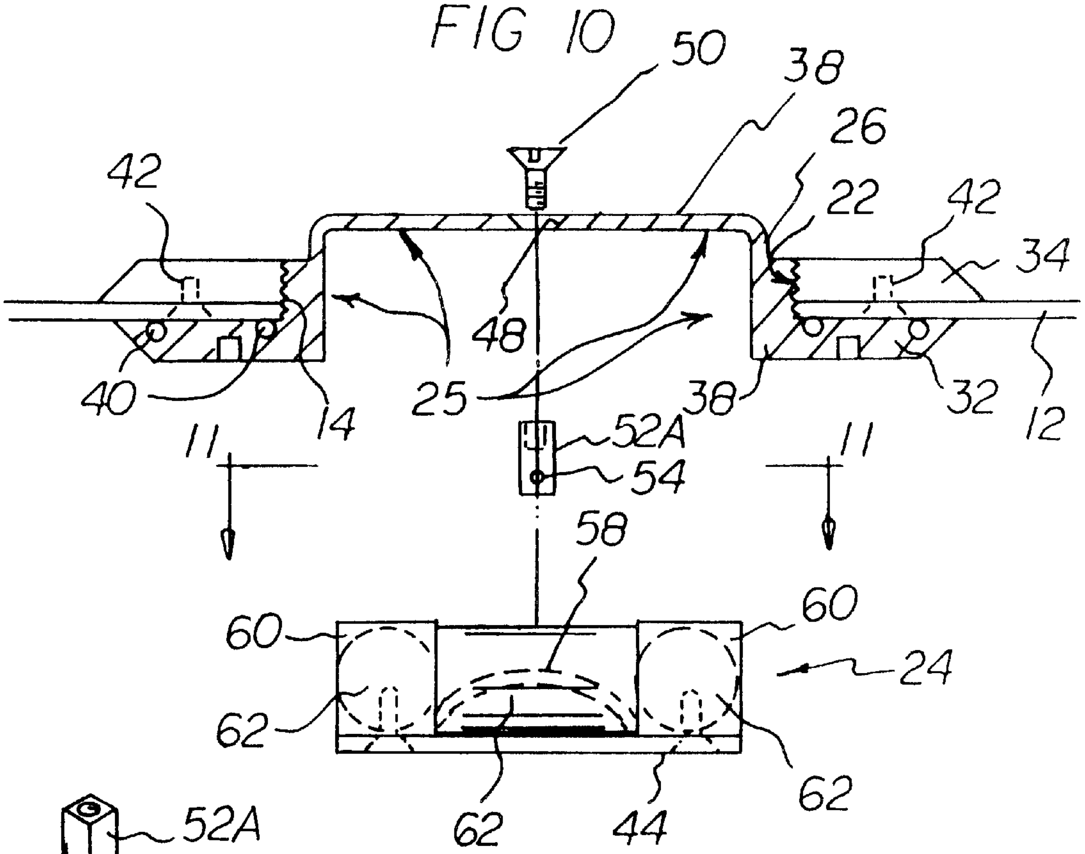
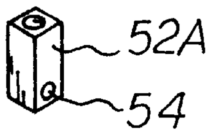
FIG 12
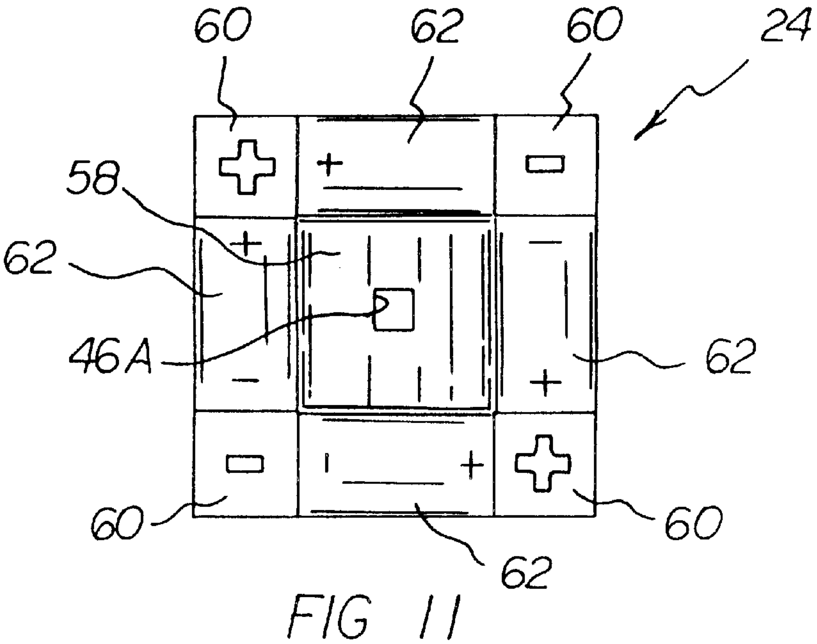
FIG 11

FIG 14
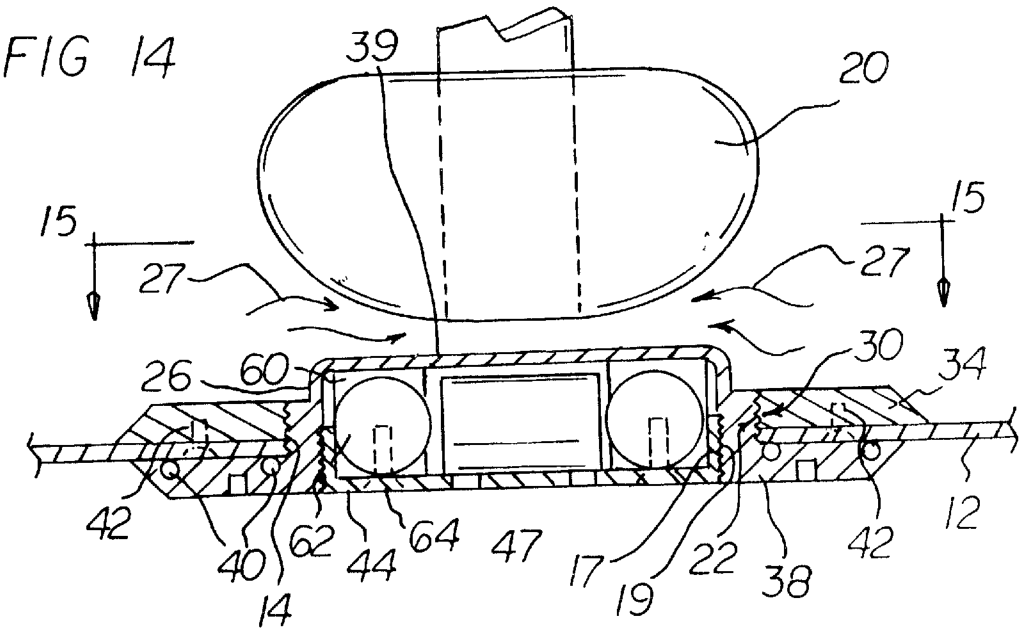
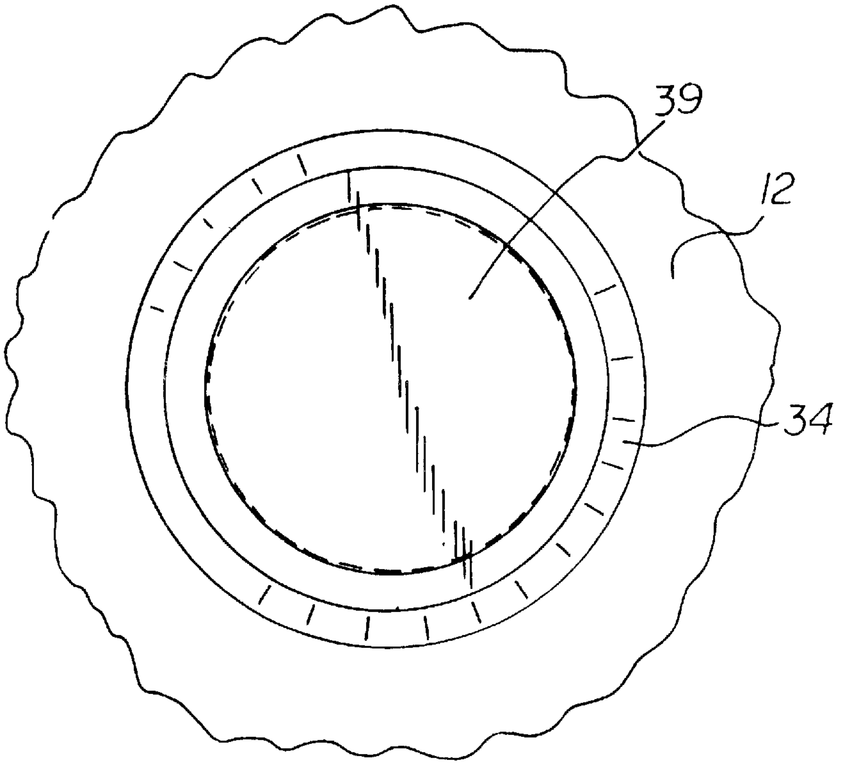
FIG 15

FIG 16
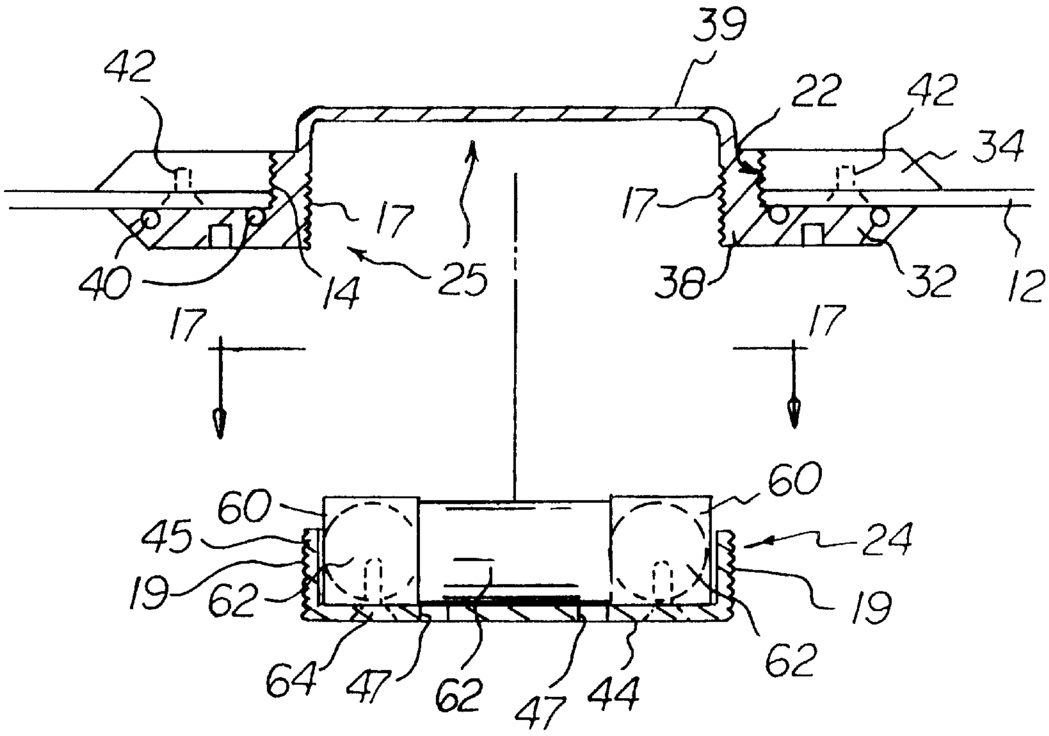
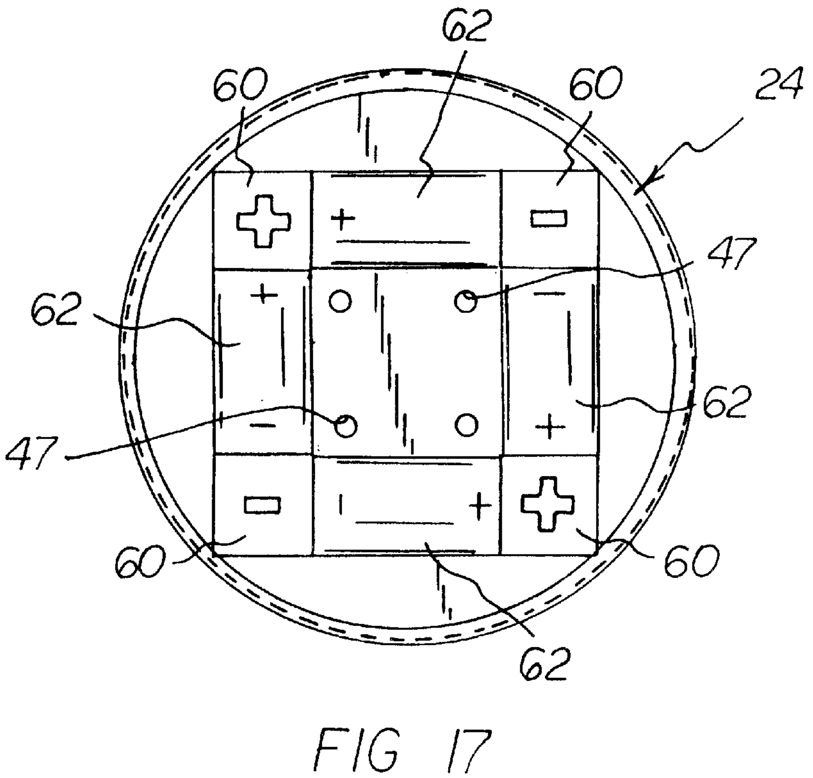
FIG 17

FIG 19
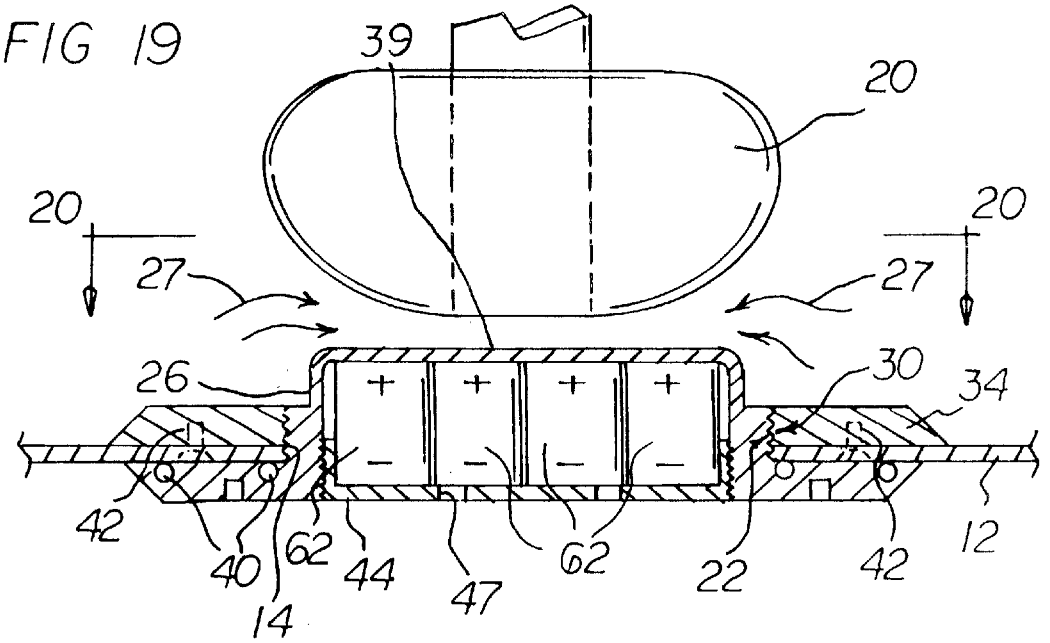
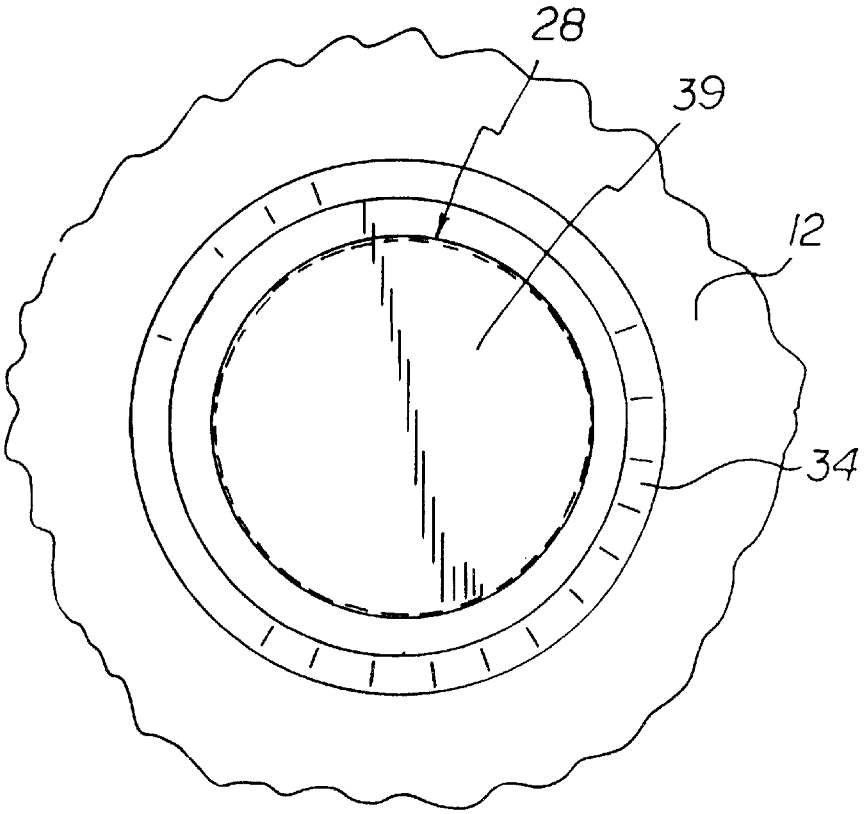
FIG 20

FIG 21
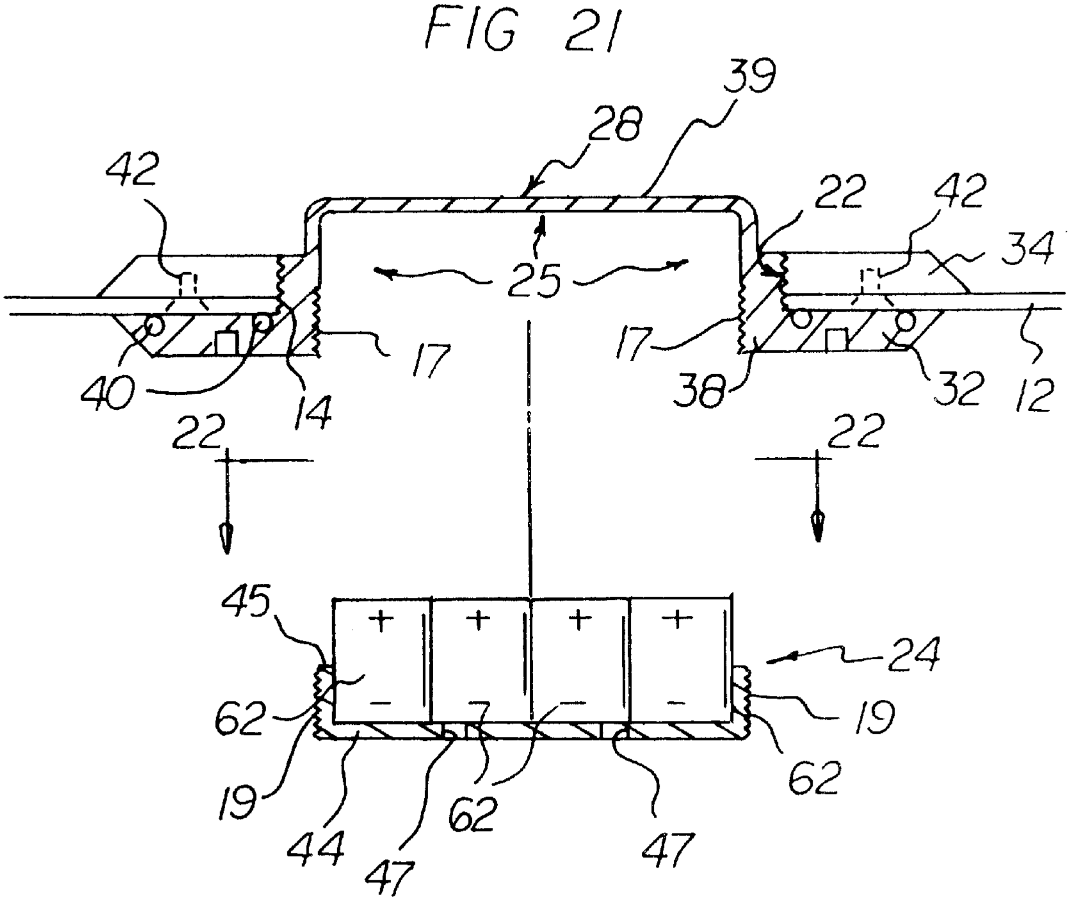
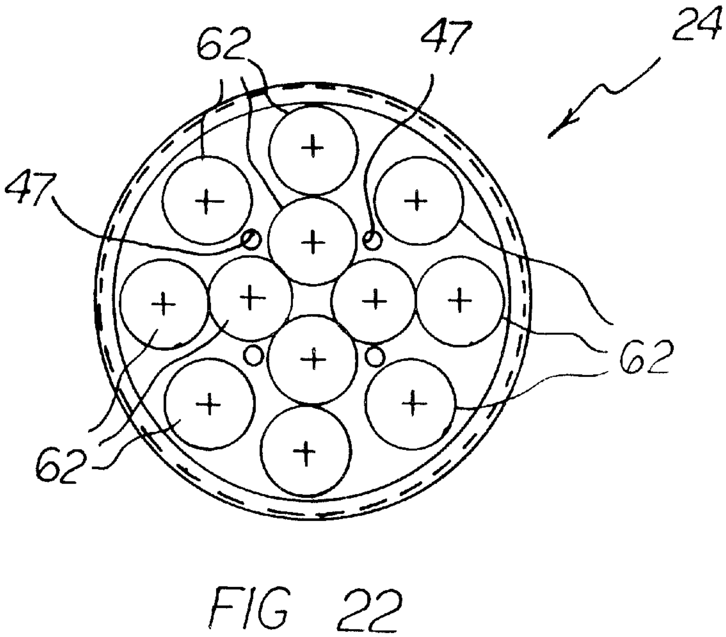
FIG 22

OIL PAN CONTAINING A MAGNETIC FILTER APPARATUS

BACKGROUND OF THE INVENTION

1. Field of the Invention

The present invention relates generally to oil filter devices and, more particularly, to oil filter devices mounted on motor vehicles.

2. Description of the Prior Art

The use of oil filtering devices for motor vehicles is known in the prior art. In my prior patent U.S. Pat. No. 5,510,024 there is disclosed a magnet assembly or attachment for magnetically collecting metallic particles within an oil filter. That inventive device includes a pair of magnets supported in a spaced relationship by a carrier which latter is positionable along an exterior of a filter cartridge. The carrier serves the additional function of a heat sink. A shunt couples opposite poles of the magnets together to increase the magnetic flux directed into the filter cartridge to separate and retain metallic particles from the filtered fluid.

An oil lubrication circuit of a motor vehicle includes a variety of components, two of which are an oil pan and an oil pump that includes an oil intake pipe. Oil flows from the oil pan into the oil intake pipe. It is conceived by the present inventor that it would be desirable to apply magnetic treatment of the circulating oil in the vicinity of the oil intake pipe of the oil pump.

To optimize the application of magnetic fields to the vicinity of the oil intake pipe, it would be desirable to provide an element which directs the flow of oil to a prepositioned gap between the oil intake pipe and a magnetic assembly.

In addition to providing a reservoir for oil, an oil pan covers the oil intake pipe. In this respect, it would be desirable if an oil pan were provided that is combined with a magnet assembly that is positioned near the oil intake pipe.

In view of the above considerations, the present inventor discloses herein an improved combined oil pan and magnetic filter apparatus. Yet, still other features would be desirable in such combined oil pan containing and magnetic filter apparatus. For example, it would be desirable if the magnet assembly could easily be removed from the oil pan for cleaning and replaced in the oil pan after being cleaned.

Moreover, it would be desirable if an oil pan containing a magnetic filter apparatus were provided which includes a magnet unit which includes a plurality of magnets arrayed to strongly concentrate magnetic flux for attracting and retaining ferro-magnetic particles, thereby effectively separating the ferro-magnetic particles from the oil.

Thus, while the foregoing body of prior art indicates it to be well known to use a magnet assembly for aiding in the filtration of oil in a motor vehicle, the prior art described above does not teach or suggest an oil pan containing a magnetic filter apparatus which has the following combination of desirable features: (1) magnetically treats circulating oil in the vicinity of the oil intake pipe of the oil pump; (2) provides an element which directs the flow of oil to a prepositioned gap between an oil intake pipe and a magnetic assembly; (3) combines an oil pan with a magnet assembly that is positioned near the oil intake pipe; (4) provides a magnet assembly that can easily be removed from the oil pan for cleaning and replaced in the oil pan after being cleaned; and (5) provides a magnet unit having a plurality of magnets arrayed to strongly concentrate magnetic flux for attracting and retaining ferro-magnetic particles, thereby effectively separating the ferro-magnetic particles from the oil. The foregoing desired characteristics are provided by the unique oil pan containing a magnetic filter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an oil pan containing a magnetic filter apparatus which includes an oil pan member which includes a magnet assembly reception channel. A magnetic filter assembly is received in the magnet assembly reception channel, and attachment means are provided for attaching the magnetic filter assembly to the oil pan member. The magnetic filter assembly separates ferro-magnetic particles from oil in the oil pan member and traps the separated particles on the magnetic filter assembly.

The magnetic filter assembly includes a magnet support unit which is attachable to the attachment means. A magnet unit is supported by the magnet support unit. The magnet unit provides a high magnetic flux region to circulating oil in the vicinity of an oil pump intake tube for trapping metal particles on the magnetic filter assembly.

More specifically, the magnetic filter assembly includes a magnet support unit and a magnet unit supported by the magnet support unit. The magnet support unit includes a support connector portion. A support riser portion is connected to the support connector portion. A magnet holding member is connected to the support riser portion. A sealing flange portion is connected to a bottom end of the support connector portion, and a first attachment ring portion is connected to the sealing flange portion. The magnet unit provides a high magnetic flux region to circulating oil in the vicinity of an oil pump intake tube, and attachment means for connecting with the support connector portion for attaching the magnetic filter assembly to the oil pan member.

The support connector portion includes external threads for engaging complimentary internal threads of the attachment means. The attachment means includes a second attachment ring placed on an inside surface of the oil pan member, and fasteners connect the second attachment ring with a portion of the oil pan member. The second attachment ring includes internal threads for engaging complimentary external threads on the support connector portion.

The magnet unit includes a magnet unit floor member. A plurality of individual magnets are connected to the magnet unit floor member. Connection means are provided for connecting the magnet unit to the magnet support unit. The connection means include a connector sleeve reception channel in the magnet unit floor member. A connector screw reception channel is in the magnet holding member. A connector screw is received in the connector screw reception channel. A connector sleeve is screwed onto the connector screw. The connector sleeve includes a pin reception channel, and a lock pin is received in the pin reception channel. The magnet unit floor member includes a central riser region which extends upward towards the magnet holding member.

The plurality of individual magnets includes a set of first bar magnets supported on the magnet unit floor member and extending longitudinally upward from the magnet unit floor member. A set of second bar magnets are supported on the magnet unit floor member and extend transversely along the magnet unit floor member. Magnet attachment screws are provided for securing the first bar magnets to the magnet unit floor member.

The first bar magnets extend upward from four comer areas of the magnet unit floor member. The first bar magnets are arrayed sequentially at the four comer areas of the magnet unit floor member with sequentially opposite magnetic polarity orientation.

The second bar magnets are arrayed sequentially at sides of the magnet unit floor member between the four comer areas of the magnet unit floor member with sequentially opposite magnetic polarity orientation. Respective polarities of the first bar magnets are arrayed with respect to opposite polarities of the second bar magnets.

In accordance with another aspect of the invention, the second bar magnets have a vertical height that is approximately equal to the cylindrical diameter of the first bar magnets, and the magnet holding member has flat top surface.

With another aspect of the invention, wherein both the connector sleeve and the connector sleeve reception channel have a square cross-section.

In accordance with yet another aspect of the invention, the magnet unit includes a magnet unit floor member and a magnet unit wall portion extending upward from the magnet unit floor member, and the magnet unit floor member includes spanner wrench reception channels. The magnet unit to magnet support unit connection means includes internal threads on an inner portion of the sealing flange portion and external threads on the magnet unit wall portion. The first bar magnets and the second bar magnets are retained within a magnet retention space defined by the magnet unit floor member and the magnet unit wall portion.

With still another aspect of the invention, a plurality of first bar magnets are received the magnet unit, wherein all of the first bar magnets are aligned with their respective longitudinal axes parallel and oriented vertically.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining four preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved oil pan containing a magnetic filter apparatus which has all of the advantages of the prior art and none of the disadvantages.

It is another object of the present invention to provide a new and improved oil pan containing a magnetic filter apparatus which may be easily and efficiently manufactured and marketed.

It is a further object of the present invention to provide a new and improved oil pan containing a magnetic filter apparatus which is of durable and reliable construction.

An even further object of the present invention is to provide a new and improved oil pan containing a magnetic filter apparatus which is susceptible of a low cost of manufacture with regard to both materials and labor, and which accordingly is then susceptible of low prices of sale to the consuming public, thereby making such oil pan containing a magnetic filter apparatus available to the buying public.

Still yet a further object of the present invention is to provide a new and improved oil pan containing a magnetic filter apparatus which magnetically treats circulating oil in the vicinity of the oil intake pipe of the oil pump.

Still another object of the present invention is to provide a new and improved oil pan containing a magnetic filter apparatus that provides an element which directs the flow of oil to a prepositioned gap between an oil intake pipe and a magnetic assembly.

Yet another object of the present invention is to provide a new and improved oil pan containing a magnetic filter apparatus which combines an oil pan with a magnet assembly that is positioned near the oil intake pipe.

Even another object of the present invention is to provide a new and improved oil pan containing a magnetic filter apparatus that provides a magnet assembly that can easily be removed from the oil pan for cleaning and replaced in the oil pan after being cleaned.

Still another object of the present invention is to provide a new and improved oil pan containing a magnetic filter apparatus that provides a magnet unit having a plurality of magnets arrayed to strongly concentrate magnetic flux for attracting and retaining ferro-magnetic particles, thereby effectively separating the ferro-magnetic particles from the oil.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the oil pan containing a magnetic filter apparatus of the invention.

FIG. 2 is an enlarged bottom view of the embodiment of the oil pan containing a magnetic filter apparatus of FIG. 1.

FIG. 3 is an enlarged cross-sectional view of the embodiment of the invention shown in FIG. 2 taken along line 3—3 thereof.

FIG. 4 is an enlarged top view of the embodiment of the oil pan containing a magnetic filter apparatus of FIG. 2.

FIG. 5 is a partially exploded cross-sectional view of the embodiment of the invention shown in FIG. 3 wherein the magnet unit is separated from the magnet holding member of the magnet support unit.

FIG. 6 is a top view of the magnet unit of FIG. 5 taken along line 6—6 thereof.

FIG. 8 is an enlarged cross-sectional view of a second embodiment of the invention.

FIG. 9 is an enlarged top view of the second embodiment of the oil pan containing a magnetic filter apparatus of FIG. 8.

FIG. 10 is a partially exploded cross-sectional view of the embodiment of the invention shown in FIG. 8 wherein the magnet unit is separated from the magnet holding member of the magnet support unit.

FIG. 11 is a top view of the magnet unit of FIG. 10 taken along line 11—11 thereof.

FIG. 12 is a perspective view of a connector sleeve that has a square cross-section.

FIG. 14 is an enlarged cross-sectional view of a third embodiment of the invention.

FIG. 15 is an enlarged top view of the third embodiment of the oil pan containing a magnetic filter apparatus of FIG. 14.

FIG. 16 is a partially exploded cross-sectional view of the embodiment of the invention shown in FIG. 14 wherein the magnet unit is separated from the magnet holding member of the magnet support unit.

FIG. 17 is a top view of the magnet unit of FIG. 16 taken along line 17—17 thereof.

FIG. 19 is an enlarged cross-sectional view of a fourth embodiment of the invention.

FIG. 20 is an enlarged top view of the fourth embodiment of the oil pan containing a magnetic filter apparatus of FIG. 19.

FIG. 21 is a partially exploded cross-sectional view of the embodiment of the invention shown in FIG. 19 wherein the magnet unit is separated from the magnet holding member of the magnet support unit.

FIG. 22 is a top view of the magnet unit of FIG. 21 taken along line 21—21 thereof.

DESCRIPTION OF THE PREFERRED EMBODIMENT

With reference to the drawings, a new and improved oil pan containing a magnetic filter apparatus embodying the principles and concepts of the present invention will be described.

Figure 7:
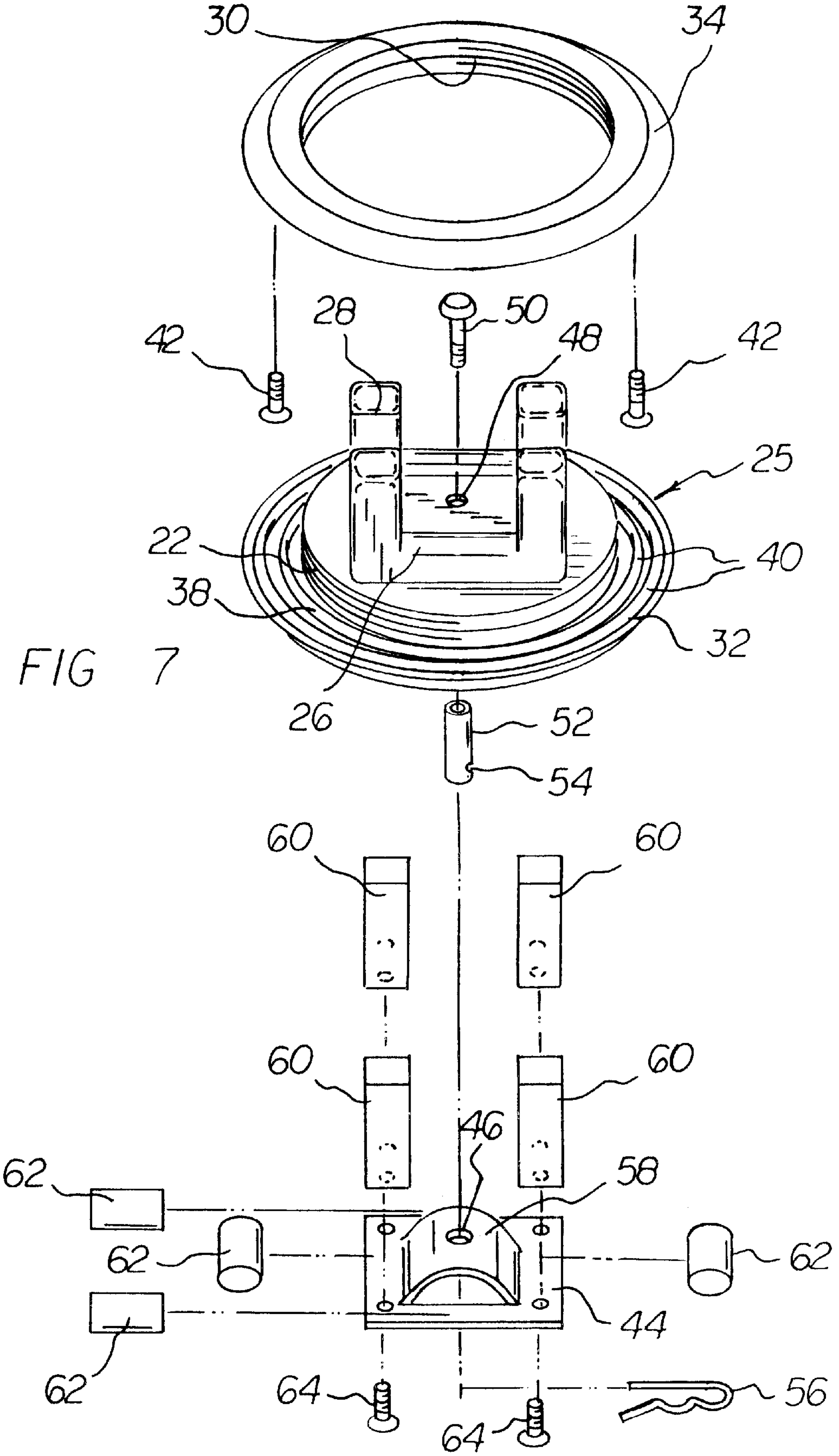
FIG. 7 is an exploded perspective view of the first embodiment of the magnetic filter apparatus of the invention, excluding the oil pan member.

Turning to FIGS. 1–7, there is shown a first embodiment of the oil pan containing a magnetic filter apparatus of the invention generally designated by reference numeral 10. In the first embodiment, an oil pan containing a magnetic filter apparatus 10 includes an oil pan member 12 which includes a magnet assembly reception channel 14. A magnetic filter assembly 16 is received in the magnet assembly reception channel 14, and attachment means are provided for attaching the magnetic filter assembly 16 to the oil pan member 12. An oil pump intake tube 20 of an oil pump (not shown) is provided for directing oil flow to a high magnetic flux region of the magnetic filter assembly 16. The magnetic filter assembly 16 separates ferro-magnetic particles from oil in the oil pan member 12 and traps the separated particles on the magnetic filter assembly 16.

The magnetic filter assembly 16 includes a magnet support unit 25 which is attachable to the attachment means. A magnet unit 24 is supported by the magnet support unit 25. The magnet unit 24 provides a high magnetic flux region to circulating oil in the vicinity of an oil pump intake tube 20 for trapping metal particles on the magnetic filter assembly 16. The magnet unit 24 can be a magnet unit such as disclosed in U. S. Pat. No. 5,510,024, incorporated herein by reference Alternately, and preferably, the magnet unit 24 can be as described hereinbelow.

The magnet support unit 25 includes a support connector portion 22 for connecting to the attachment means. A sealing flange portion 38 extends below the support connector portion 22, and a first attachment ring portion 32 extend outward from the sealing flange portion 38. A support riser portion 26 extends above the support connector portion 22, and a magnet holding member 28 is connected to the support riser portion 26. The support connector portion 22 includes external threads for engaging complimentary internal threads of the attachment means.

Serving as attachment means for connecting the magnetic filter assembly 16 to the oil pan member 12, a second attachment ring 34 is placed on an inside surface of the oil pan member 12 encompassing the magnet assembly reception channel 14. The second attachment ring 34 has internal threads 30. Fasteners 42 connect the second attachment ring 34 to the oil pan member 12.

The magnet unit 24 includes a magnet unit floor member 44. A plurality of individual magnets are connected to the magnet unit floor member 44. Connection means are provided for connecting the magnet unit 24 to the magnet support unit 25. The connection means include a connector sleeve reception channel 46 in the magnet unit floor member 44. A connector screw reception channel 48 is in the magnet holding member 28. A connector screw 50 is received in the connector screw reception channel 48. A connector sleeve 52 is screwed onto the connector screw 50. The connector sleeve 52 includes a pin reception channel 54, and a lock pin 56 is received in the pin reception channel 54.

The magnet unit floor member 44 includes a central riser region 58 which extends upward towards the magnet holding member 28. The central riser region 58 serves two functions. One function is to permit connection of the magnet unit 24 to the magnet holding member 28. The other function of the central riser region 58 is to align the plurality of individual magnets in the magnet unit 24.

The connector screw 50, the magnet holding member 28, the connector sleeve 52, the central riser region 58, the pin reception channel 54, and the lock pin 56 all cooperate to secure the magnet unit 24 to the magnet support unit 25. More specifically, the lock pin 56 is located on the bottom side of the central riser region 58, and the head of the connector screw 50 is located on the top side of the magnet holding member 28. When the connector screw 50 is screwed into the internally threaded portion of the connector sleeve 52, the connector screw 50 pulls the connector sleeve 52, the central riser region 58, and the lock pin 56 towards itself. In essence, the connector sleeve 52 and the central riser region 58 are securely sandwiched between the head of the connector screw 50 and the lock pin 56. In this way, the magnet unit 24 is firmly secured to the magnet support unit 25.

The plurality of individual magnets includes a set of first bar magnets 62 supported on the magnet unit floor member 44 and extend transversely along the magnet unit floor member 44. The first bar magnets 62 can be separated from each other by separation posts located at the comers of the magnet unit floor member 44. The separation posts can be secured to the magnet unit floor member 44 using attachment screws. The separation posts can be non-magnetic, if desired. The separation posts and the attachment screws are not illustrated in the drawings.

Alternatively, the plurality of individual magnets includes a set of second bar magnets 60 supported on the magnet unit floor member 44 and extending longitudinally upward from the magnet unit floor member 44. That is, the separation posts can be replaced by the second bar magnets 60, and the attachment screws can be replaced by magnet attachment screws 64.

As shown in FIG. 3, there are portions of the inner surfaces of the magnet holding member 28 that are in close contact with the top surfaces of the first bar magnets 62 and the second bar magnets 60. The close contact of those inner surfaces of the magnet holding member 28 with the respective magnets provides that oil in the oil pan member 12 comes into a high magnetic flux region so that ferromagnetic particles in the oil are firmly adhered to the top of the magnet holding member 28.

The second bar magnets 60 extend upward from four comer areas of the magnet unit floor member 44. The second bar magnets 60 are arrayed sequentially at the four comer areas of the magnet unit floor member 44 with sequentially opposite magnetic polarity orientation. In the drawing figures, the north pole for a magnet is represented by a "+" (plus) sign, and the south pole for a magnet is represented by a "−" (minus) sign.

The first bar magnets 62 are arrayed sequentially at sides of the magnet unit floor member 44 between the four comer areas of the magnet unit floor member 44 with sequentially opposite magnetic polarity orientation. Respective polarities of the second bar magnets 60 are arrayed with respect to opposite polarities of the first bar magnets 62. That is, of the second bar magnets 60, each second bar magnet 60 has a floor-contacting end in contact with opposite polarity portions of two first bar magnets 62. In addition, each of the first bar magnets 62 has a respective polarity end in contact with a second bar magnet 60 of opposite polarity. The opposing polarity nature of the contact between the respective first and second bar magnets provides a strongly unified and cohesive magnet unit 24 and provides relatively high magnet fields with relatively highly concentrated magnetic lines of force.

To implement the oil pan containing a magnetic filter apparatus 10 of the invention, either a conventional oil pan member 12 is obtained and a magnet assembly reception channel 14 is established therein, or an oil pan member 12 already containing a magnet assembly reception channel 14 is provided.

With respect to the oil pan member 12, the second attachment ring 34 is placed on the inner side of the oil pan member 12, with the second attachment ring 34 encompassing the magnet assembly reception channel 14. The fasteners 42 provide an oil tight seal between the second attachment ring 34 and the oil pan member 12. Then, the magnet holding member 28 and the support riser portion 26 of the magnet support unit 25 are moved through the magnet assembly reception channel 14 and into the interior of the oil pan member 12. Then, the support connector portion 22 is screwed into the internal threads 30 of the second attachment ring 34. When this occurs, the sealing flange portion 38 and the first attachment ring portion 32 press up against the outer surface of the oil pan member 12. There are two sealing rings 40 which form an oil tight seal between the magnet support unit 25 and the oil pan member 12. More specifically, there is an inner sealing ring 40 and an outer sealing ring 40. The inner sealing ring 40 has a smaller internal radius than the outer sealing ring 40. The outer sealing ring 40 lies circumferentially outside the location of the fasteners 42.

Then, oil is added to the crankcase of the motor vehicle, and oil enters the oil pan member 12 which has been attached to the motor vehicle using an oil-tight seal. When the engine of the motor vehicle is operating, the oil pump sucks oil up the oil pump intake pipe 20 and out from an oil pump output pipe (not shown) to lubricate the engine. For oil to reach the oil pump intake pipe 20 from the oil pan member 12, oil follows the pathway shown by arrows 27 in FIG. 3. More specifically, oil is sucked from the interior of the oil pan member 12 around the support riser portion 26 of the magnetic filter assembly 16, across the top of magnet holding member 28, and into the oil pump intake pipe 20. The regions next to the support riser portion 26 and above the magnet holding member 28 are high magnetic flux regions due to the presence of the magnet unit 24 attached to the bottom side of the magnet holding member 28. Consequently, when oil from the interior of the oil pan passes beside the support riser portion 26 and across the top of the magnet holding member 28, that oil is subjected to high magnetic flux. As a result, ferro-magnetic particles in that high magnetic flux region are attracted to the magnet unit 24, and those particles are separated from the flowing oil and are retained on the support riser portion 26 and on the top of the magnet holding member 28.

To service the oil pan containing a magnetic filter apparatus 10 of the invention, after oil is drained from the oil pan member 12 from a conventional drain plug 23, the magnetic filter assembly 16 can be unscrewed from the second attachment ring 34 and the oil pan member 12. Then, the top of the magnet holding member 28 and the support riser portion 26 can be cleaned to remove any particles that are adhering thereto. Cleaning of the magnet holding member 28 and the support riser portion 26 can be facilitated by removing the magnet unit 24 from the magnet support unit 25. When this is done, the ferro-magnetic particles can be easily wiped off of the support riser portion 26 and the magnet holding member 28. After the magnetic filter assembly 16 has been cleaned and reassembled, the cleaned magnetic filter assembly 16 can be screwed back into the oil pan member 12 and the second attachment ring 34, and an oil-tight seal is re-established between the sealing flange portion 38 of the magnetic filter assembly 16 and the oil pan member 12 using the inner and outer sealing rings 40.

Figure 13:
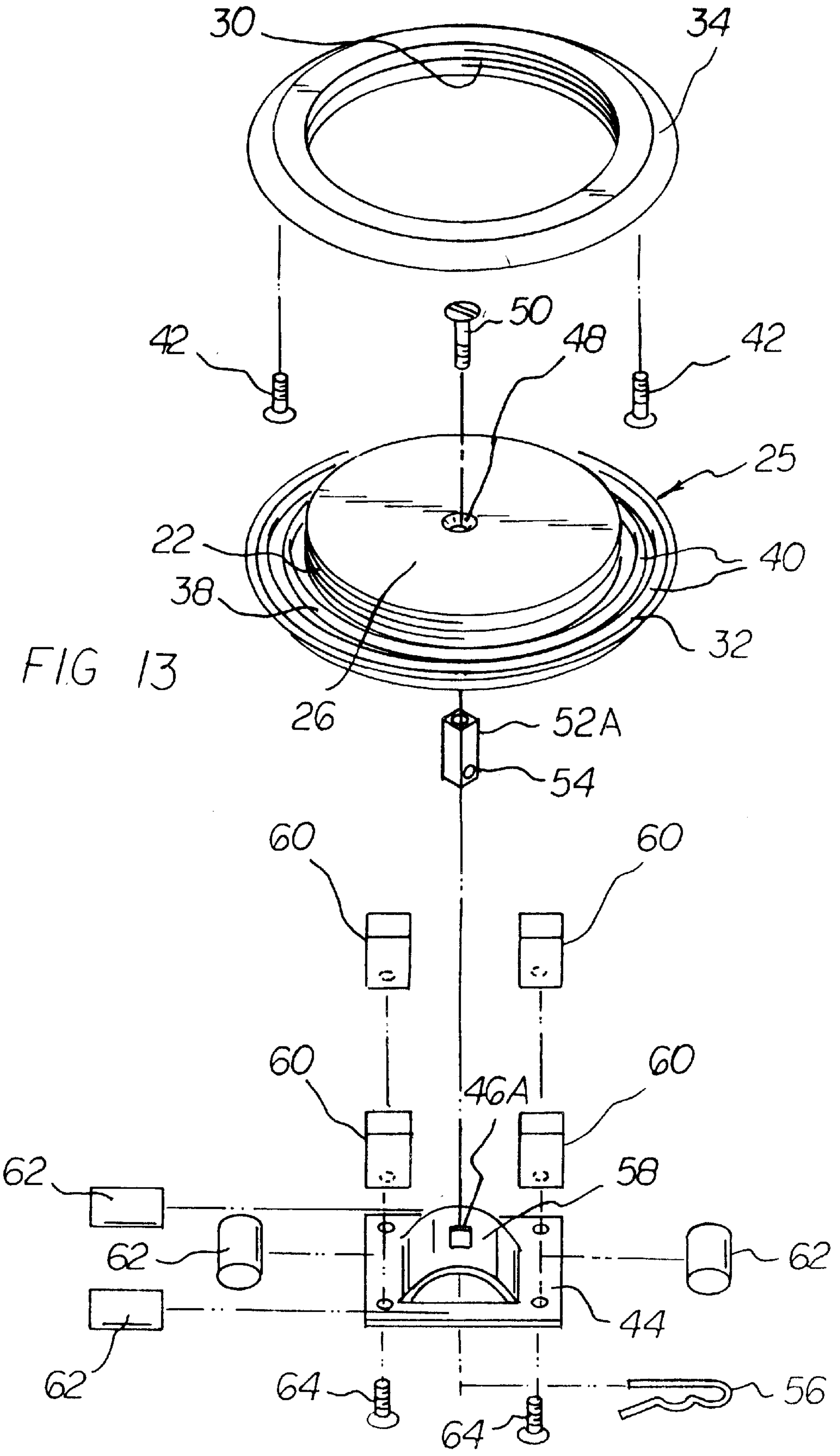
FIG. 13 is an exploded perspective view of the second embodiment of the magnetic filter apparatus of the invention, excluding the oil pan member.

Turning to FIGS. 8–13, a second embodiment of the invention is shown. Reference numerals are shown that correspond to like reference numerals that designate like elements shown in the other figures. In addition, The second bar magnets 60 have a vertical height that is approximately equal to the cylindrical diameter of the first bar magnets 62, and the magnet holding member 28 has flat top surface 39. With this embodiment of the invention, ferro-magnetic particles from the oil are trapped onto the flat top surface 39. wherein both the connector sleeve 52A and the connector sleeve reception channel 46A have a square cross-section. The interrelationship between the square connector sleeve 52A and the square connector sleeve reception channel 46A prevent the magnet unit 24 from rotating with respect to the magnet support unit 25 due to engine vibrations and road shocks.

Figure 18:
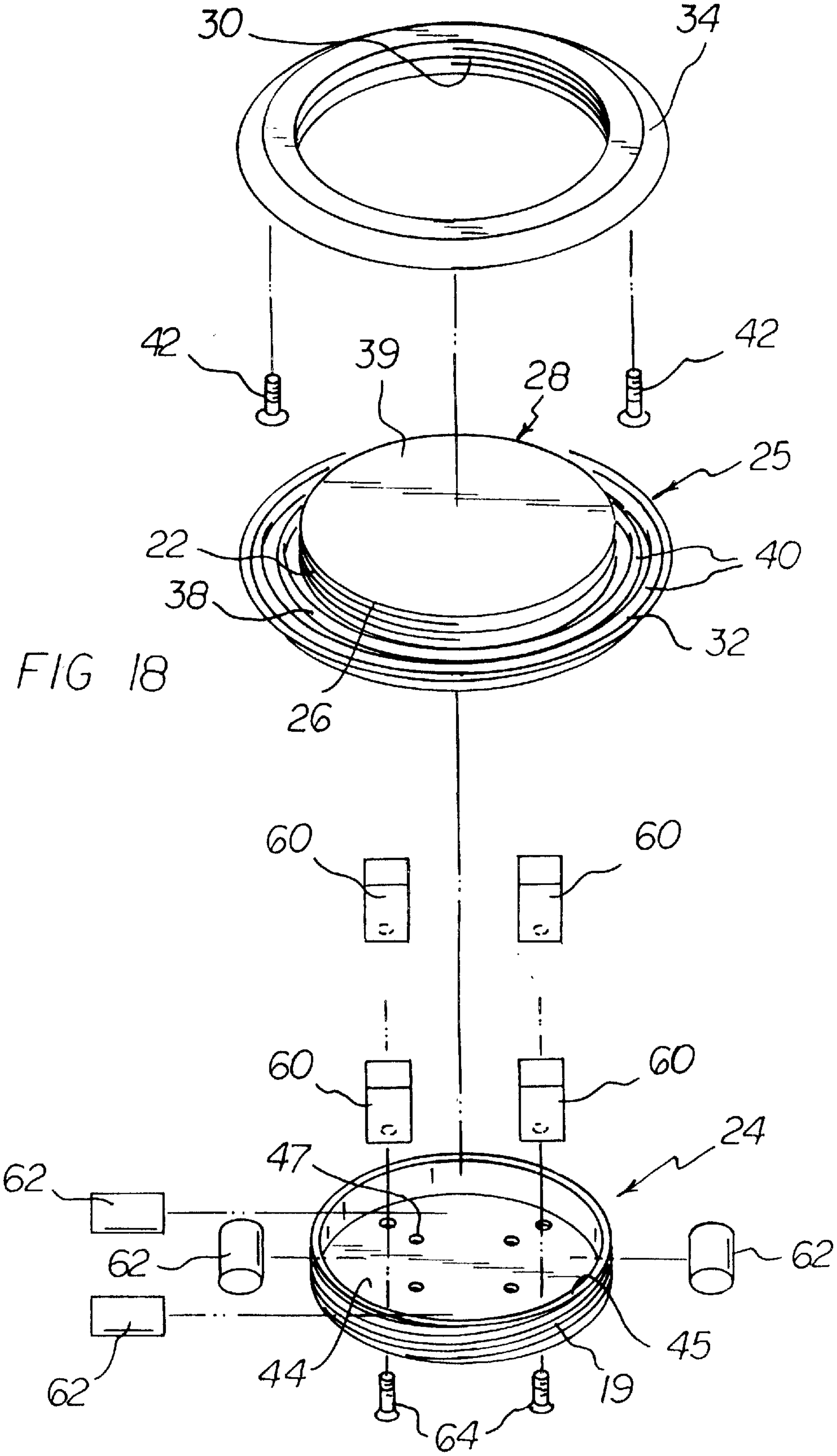
FIG. 18 is an exploded perspective view of the third embodiment of the magnetic filter apparatus of the invention, excluding the oil pan member.

Turning to FIGS. 14–18, a third embodiment of the invention is shown. Reference numerals are shown that correspond to like reference numerals that designate like elements shown in the other figures. In addition, The magnet unit 24 includes a magnet unit floor member 44 and a magnet unit wall portion 45 extending upward from the magnet unit floor member 44, and the magnet unit floor member 44 includes spanner wrench reception channels 47, the magnet unit to magnet support unit connection 92 includes internal threads 17 on an inner portion of the sealing flange portion 38 and external threads 19 on the magnet unit wall portion 45.

The first bar magnets 62 and the second bar magnets 60 are retained within a magnet retention space defined by the magnet unit floor member 44 and the magnet unit wall portion 45. To fit the magnet unit 24 onto the magnet support unit 25, the magnet unit 24 is grasped, and the external threads 19 of the magnet unit 24 are screwed into the internal threads 17 of the magnet support unit 25. The screwing-in step is continued so that the tops of the first bar magnets 62 and the second bar magnets 60 are adjacent the bottom surface of the magnet holding member 28. When this is done. A high magnetic flux region 100 is present at the flat top surface 39 of the magnet holding member 28 so that ferro-magnetic particles 101 from the oil are readily trapped on the flat top surface 39.

To securely tighten the magnet unit 24 onto the magnet support unit 25. A spanner wrench 102 (not shown) can be employed. More specifically, the spanner ends are fit into the spanner wrench reception channels 47, and the spanner wrench 102 is used to tighten the magnet unit 24 onto the magnet support unit 25.

Turning to FIGS. 19–22, a fourth embodiment of the invention is shown. Reference numerals are shown that correspond to like reference numerals that designate like elements shown in the other figures. In addition, wherein a plurality of first bar magnets 62 are received the magnet unit 24, wherein all of the first bar magnets 62 are aligned with their respective longitudinal axes parallel and oriented vertically. The first bar magnets 62 are received in the magnet unit 24 so that the first bar magnets 62 provide clearances around the spanner wrench reception channels 47 so that use of a spanner wrench 102 is not interfered with by the presence of the first bar magnets 62.

The components of the oil pan containing a magnetic filter apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved oil pan containing a magnetic filter apparatus that is low in cost, relatively simple in design and operation, and which may advantageously be used to magnetically treat circulating oil in the vicinity of the oil intake pipe of the oil pump. With the invention, an oil pan containing a magnetic filter apparatus provides an element which directs the flow of oil to a prepositioned gap between an oil intake pipe and a magnetic assembly. With the invention, an oil pan containing a magnetic filter apparatus is provided which combines an oil pan with a magnet assembly that is positioned near the oil intake pipe. With the invention, an oil pan containing a magnetic filter apparatus provides a magnet assembly that can easily be removed from the oil pan for cleaning and replaced in the oil pan after being cleaned. With the invention, an oil pan containing a magnetic filter apparatus provides a magnet unit having a plurality of magnets arrayed to strongly concentrate magnetic flux for attracting and retaining ferro-magnetic particles, thereby effectively separating the ferro-magnetic particles from the oil.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. An oil pan containing a magnetic filter apparatus, comprising:

an oil pan member which includes a magnet assembly reception channel, a magnetic filter assembly received in said magnet assembly reception channel, wherein said magnetic filter assembly includes a magnet support unit defining a substantially sealed cavity facing an exterior of said oil pan member, and a magnet unit supported by said magnet support unit within said substantially sealed cavity, wherein said magnet support unit includes a support connector portion for connecting a lower end of said magnet support unit to said oil pan member, a support riser portion connected to said support connector portion extending upwardly from said support connector portion, a magnet holding member connected to an upper end of said support riser portion, a sealing flange portion connected to a bottom end of said support connector portion for sealingly engaging said oil pan member, and a first attachment ring portion connected to and extending radially outwardly from said sealing flange portion, wherein said magnet unit provides a high magnetic flux region to circulating oil in the vicinity of an oil pump intake tube, and attachment means for connecting with said support connector portion for attaching said magnetic filter assembly to said oil pan member.

2. The apparatus of claim 1 wherein said support connector portion includes external threads for engaging complimentary internal threads of said attachment means.

3. The apparatus of claim 1 wherein said attachment means includes:

a second attachment ring placed on an inside surface of said oil pan member, and fasteners which connect said second attachment ring with a portion of said oil pan member.

4. The apparatus of claim 3 wherein said second attachment ring includes internal threads for engaging complimentary external threads on said support connector portion.

5. The apparatus of claim 1 wherein:

said magnet unit includes a magnet unit floor member, a plurality of individual magnets connected to said magnet unit floor member, connection means for connecting said magnet unit to said magnet support unit.

6. The apparatus of claim 5 wherein said connection means include:

a connector sleeve reception channel in said magnet unit floor member, a connector screw reception channel in said magnet holding member, a connector screw received in said connector screw reception channel, a connector sleeve that is screwed onto said connector screw, wherein said connector sleeve includes a pin reception channel, and a lock pin received in said pin reception channel.

7. The apparatus of claim 6 wherein both said connector sleeve and said connector sleeve reception channel have a square cross-section.

8. The apparatus of claim 5 wherein said magnet unit floor member includes a central riser region which extends upward towards said magnet holding member.

9. The apparatus of claim 5 wherein said plurality of individual magnets include:

a set of first bar magnets supported on said magnet unit floor member and extending transversely along said magnet unit floor member.

10. The apparatus of claim 9 wherein said first bar magnets are arrayed sequentially at sides of said magnet unit floor member between four comer areas of said magnet unit floor member with sequentially opposite magnetic polarity orientation.

11. The apparatus of claim 10 wherein said plurality of individual magnets include:

a set of second bar magnets supported on said magnet unit floor member and extending longitudinally upward from said magnet unit floor member.

12. The apparatus of claim 11 wherein respective polarities of said first bar magnets are arrayed with respect to opposite polarities of said second bar magnets.

13. The apparatus of claim 11, further including:

magnet attachment screws for securing said second bar magnets to said magnet unit floor member.

14. The apparatus of claim 11 wherein said second bar magnets extend upward from said four comer areas of said magnet unit floor member.

15. The apparatus of claim 11 wherein said second bar magnets are arrayed sequentially at said four comer areas of said magnet unit floor member with sequentially opposite magnetic polarity orientation.

16. The apparatus of claim 11 wherein:

said second bar magnets have a vertical height that is approximately equal to a cylindrical diameter of said first bar magnets, and said magnet holding member has flat top surface.

17. The apparatus of claim 5 wherein:

said magnet unit includes a magnet unit floor member and a magnet unit wall portion extending upward from said magnet unit floor member, and wherein said magnet unit floor member includes spanner wrench reception channels, said magnet unit to magnet support unit connection means include internal threads on an inner portion of said sealing flange portion and external threads on said magnet unit wall portion, and said plurality of individual bar magnets includes first bar magnets and second bar magnets retained within a magnet retention space defined by said magnet unit floor member and said magnet unit wall portion.

18. The apparatus of claim 17 wherein a plurality of first bar magnets are received said magnet unit, wherein all of said first bar magnets are aligned with their respective longitudinal axes parallel and oriented vertically.

* * * * *